(12) United States Patent
Kashiwazaki et al.

(10) Patent No.: US 6,339,461 B1
(45) Date of Patent: Jan. 15, 2002

(54) METHOD FOR FORMING SPACERS, MANUFACTURING METHOD FOR A COLOR FILTER HAVING THE SPACERS, AND LIQUID CRYSTAL ELEMENT FORMED BY USING THE MANUFACTURING METHOD

(75) Inventors: Akio Kashiwazaki; Katsuhiro Shirota; Takeshi Miyazaki; Koichiro Nakazawa, all of Kanagawa; Masashi Hirose, Tokyo; Yoshihisa Yamashita, Kanagawa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/656,065

(22) Filed: Sep. 6, 2000

(30) Foreign Application Priority Data

Sep. 9, 1999 (JP) ............................................. 11-255011

(51) Int. Cl.$^7$ ........................................... G02F 1/1339
(52) U.S. Cl. ...................................... 349/155; 349/187
(58) Field of Search ................................. 349/155, 156, 349/187

(56) References Cited

U.S. PATENT DOCUMENTS

| 5,948,577 A | 9/1999 | Nakazawa et al. ............. 430/7 |
| 6,094,247 A | 6/2000 | Miyazaki et al. ............ 349/110 |
| 6,226,067 B1 * | 5/2001 | Nishiguchi et al. ......... 349/155 |

FOREIGN PATENT DOCUMENTS

| JP | 61-173221 | 8/1986 |
| JP | 63-82405 | 4/1988 |
| JP | 63-237032 | 10/1988 |
| JP | 2-223922 | 9/1990 |
| JP | 3-94230 | 4/1991 |
| JP | 3-184022 | 8/1991 |
| JP | 4-122914 | 4/1992 |
| JP | 9-105946 | * 4/1997 |
| JP | 10-221666 | * 8/1998 |
| JP | 11-242228 | * 9/1999 |

* cited by examiner

Primary Examiner—Kenneth Parker
Assistant Examiner—David Chung
(74) Attorney, Agent, or Firm—Fitzpatrick, Cella, Harper & Scinto

(57) ABSTRACT

A method for forming spacers according to the present invention is a method for forming the spacers on a substrate, comprising the steps of: supplying adhesive at a position for forming each of the spacers on the substrate by an inkjet system; dispersing beads, each bead having a diameter corresponding to the height of the spacer, so as to adhere the beads to adhesive; and removing the beads that are not adhered to the adhesive from the substrate. A manufacturing method for a color filter having spacers according to the present invention, the method comprises the steps of: forming a color filter by forming on a substrate at least a light-shielding layer having plural apertures and a colored layer having colored portions arranged in each of the apertures of the light-shielding layer; supplying adhesive made of a curable resin composition in regions overlapping the light-shielding layer on the color filter by an inkjet system; dispersing beads on the color filter so as to stick the beads to the adhesive; and removing the beads that are not adhered to the adhesive from the color filter. Furthermore, a liquid crystal element according the present invention comprises: a pair of substrates; and liquid crystal clamped between the pair of substrates, wherein one of the pair of substrates is a color filter having spacers made by the above-mentioned manufacturing method and the distance between the pair of substrates is maintained by the spacers.

8 Claims, 6 Drawing Sheets

METHOD FOR FORMING SPACERS, MANUFACTURING METHOD FOR A COLOR FILTER HAVING THE SPACERS, AND LIQUID CRYSTAL ELEMENT FORMED BY USING THE MANUFACTURING METHOD

BACKGROUND OF THE INVENTION

1. Field of the Invention

The present invention relates to a color-display liquid crystal element for use as color televisions and personal computers, etc., a color filter which is a constituent member of the liquid crystal element, a manufacturing method for the color filter, and to a method for forming spacers applied to the manufacturing method.

2. Description of the Related Art

Recently, demands for color liquid crystal displays are increasing along with the growth of personal computers, especially of portable personal computers. However, the cost-cutting is indispensable for the furthermore widespread use.

In a conventional manufacturing method for the liquid crystal element, after providing liquid crystal driving elements such as TFTs (thin film transistors), or coloring optical elements such as color filters, on glass substrates which are a pair of transparent insulating substrates, respective transparent electrodes and orientation films are formed. Then, over the entire surface of one of the glass substrates having the transparent electrodes and the orientation films formed thereon, perfect spherical or cylindrical particles formed of silica, alumina, a synthetic resin, and so forth having a size of between approximate 3 and 10 μm are generally dispersed as spacers. A liquid crystal element is formed by piling up the pair of glass substrates in the state of the respective transparent electrodes opposing each other via the spacers and by filling the clearance therebetween with liquid crystal.

However, since a transmitting/shielding state of light in an effective pixel portion (light-transmissive portion) is changed according to the display state, when the spacers are formed of a colorless transparent material, they are observed as luminous spots during the shielding while when the spacers are colored to be black, they are observed as black spots during the transmission, so that there has been a problem of reduced display quality.

In order to solve the above-mentioned problem, methods are proposed so that after orientation is performed in the orientation film, photosensitive polyimide or a photoresist is coated thereon so as to form spacers made of polyimide or the photoresist in the region except the effective pixel portion by exposing it to light via a mask, as shown in Japanese Patent Laid-Open No. 61-173221 and Japanese Patent Laid-Open No. 2-223922. According to these methods, since the spacers can be formed at any position in arbitrary density, non-uniformity in the liquid crystal cell gap can be reduced when filling the gap with liquid crystal. Japanese Patent Laid-Open No. 3-94230 also discloses a method for affixing bead spacers on a light-shielding layer in the regions except the effective pixel portions.

Other methods are proposed, such as a method to have a black matrix having large thickness as spacers (Japanese Patent Laid-Open No. 63-237032, Japanese Patent Laid-Open No. 3-184022, and Japanese Patent Laid-Open No. 4-122914, etc.), a method to have pilled up colored resists as spacers (Japanese Patent Laid-Open No. 63-82405), and a method for forming a colored pattern on the black matrix as well to have spacers (Japanese Patent Laid-Open No. 63-237032).

Any of the improved methods disclosed in the above-mentioned publications uses photolithography, so that an expensive exposure system is necessary and there has also been a problem of a long production line due to a wet process such as a developer.

Also, in the improved methods, since photosensitive polyimide or the photoresist is coated over the entire surface and unnecessary portions thereof are removed by solvent, etc., after the coating, there has been a problem of contamination of the effective pixel portions. In particular, when the spacers are formed on an orientation film such as a polyimide film oriented by a rubbing method, etc., the orientational structure formed on the orientation film in the spacer forming process may be significantly contaminated and damaged, thereby, it is feared that orientation of the liquid crystal poured into the liquid crystal cell is to be uneven.

It is also preferable that the spacers be securely affixed on the surface of at least one of substrates so as to maintain the distance between the substrates (cell gap) constant.

SUMMARY OF THE INVENTION

Accordingly, it is an object of the present invention to provide a method for forming spacers so that spacers having even height can be readily formed at desired positions in the substrate, and to provide a liquid crystal element being excellent in display quality and having spacers, which are excellent in maintaining the cell gap and do not affect display, at a lower cost by using the method.

In accordance with a first aspect of the present invention, there is provided a method for forming spacers, comprising the steps of: supplying adhesive at a position for forming each of the spacers on the substrate by an inkjet system; dispersing beads, each bead having a diameter corresponding to the height of the spacer, so as to adhere the beads to adhesive; and removing the beads that are not adhered to the adhesive from the substrate.

In accordance with a second aspect of the present invention, there is provided a manufacturing method for a color filter having spacers, the method comprising the steps of: forming a color filter by forming on a substrate at least a light-shielding layer having plural apertures and a colored layer having colored portions arranged in each of the apertures of the light-shielding layer; supplying adhesive made of a curable resin composition in regions overlapping the light-shielding layer on the color filter by an inkjet system; dispersing beads on the color filter so as to stick the beads to the adhesive; and removing the beads that are not adhered to the adhesive from the color filter.

In accordance with a third aspect of the present invention, there is provided a liquid crystal element comprising: a pair of substrates; and liquid crystal clamped between the pair of substrates, wherein one of the pair of substrates is a color filter having spacers made by a manufacturing method according to the present invention and the distance between the pair of substrates is maintained by the spacers.

With these features, in the method for forming spacers according to the present invention, since the beads are adhered and affixed to the adhesive, which is supplied in desired positions by an inkjet system, the spacers can be readily formed in desired positions.

With these features, in the color filter having spacers and the manufacturing method thereof according to the present invention applying the method for forming spacers according to the present invention, the spacers are formed by an inkjet system so that they can be selectively formed on the light-shielding layer, only in the regions, which have not an effect on display, while the beads as the spacers are affixed to the color filter, thereby preventing the spacers from separating in the manufacturing process of the liquid crystal element such as the forming step of the orientation film and after the forming of the liquid crystal element.

Further objects, features and advantages of the present invention will become apparent from the following description of the preferred embodiments with reference to the attached drawings.

DESCRIPTION OF THE PREFERRED EMBODIMENTS

Figure 1A:
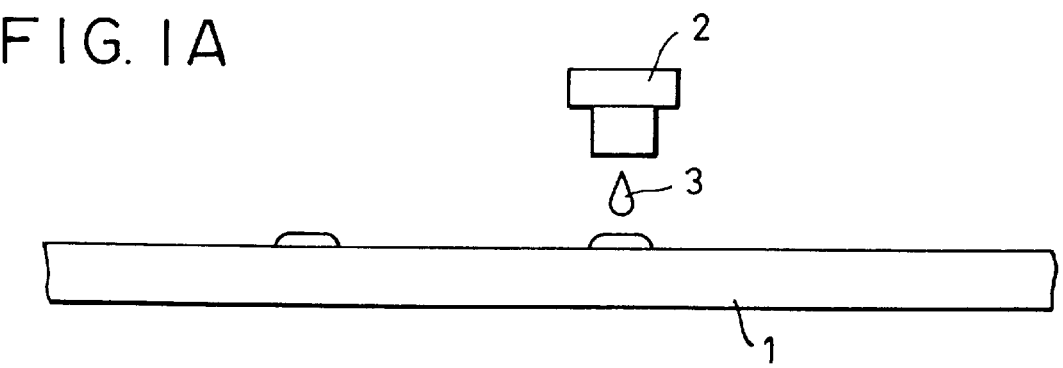
FIGS. 1A to 1C are flow diagrams of a method for forming spacers according to the present invention.
Figure 1B:
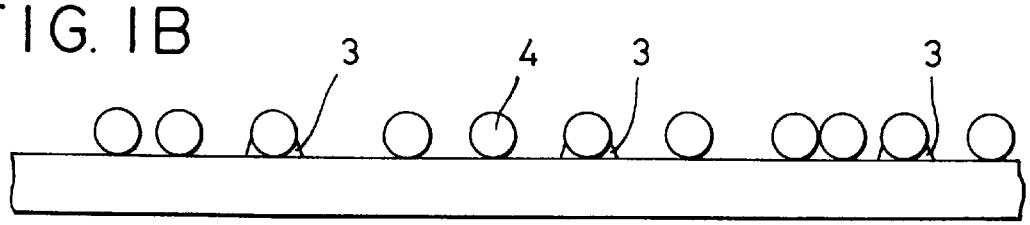
Figure 1C:
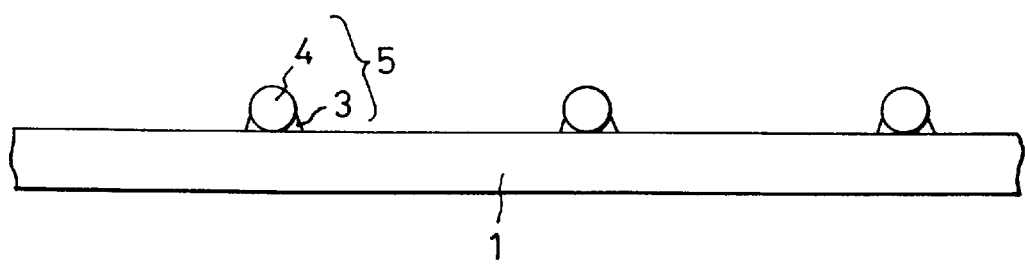

FIGS. 1A to 1C are schematic diagrams showing processes for forming spacers according to the present invention. In addition, FIGS. 1A to 1C are sectional schematic diagrams respectively corresponding to the following Steps A to C. Each Step will be described as follows.

Step A

An adhesive 3 is supplied to a desired position on a substrate 1 by an inkjet head 2. As the adhesive 3, any kind may be preferably used, so long as it is dischargeable by an inkjet system and is suitably selected according to the final use of the substrate and subsequent processes, etc. For example, in the case of a color filter according to the present invention, which will be described, a resin composition curable by light-irradiation or heating after deposition of beads is preferably used.

As an ink jet system for use in the present invention, a bubble jet type using an electrothermal converter as an energy generating element, a piezoelectric jet type using a piezoelectric transducer, or the like, can be used in which a coating area and a coating pattern of the adhesive can be arbitrarily set.

Step B

Beads 4 having a substantially uniform diameter are dispersed over the entire surface of the substrate 1.

Step C

The beads 4, which are not adhered to the adhesive 3, are removed by turning over the substrate 1, applying vibration, blowing air, flushing with liquid, or combinations thereof. Consequently, the beads 4 affixed to the substrate 1 by the adhesive 3 are left as spacers 5.

According to the method for the present invention, a coating area of the adhesive per one position can be minutely controlled on the order of 10 to 10,000 $\mu m^2$. Beads having a size of 1 to 10 $\mu m$ may be preferably used. Accordingly, this is preferably applied to a case in which a spacer is formed in an extremely small region of a member. The present invention can be preferably applied to a case in which a pair of substrates are bonded together with a predetermined clearance therebetween or a case in which plural layers are deposited on the substrate to yield the predetermined space, for example. In particular, in a liquid crystal element, since a pair of substrates are bonded together with the extremely small space therebetween and the space must be maintained for the display, the method for forming spacers according to the present invention can be even more effectively performed.

Next, a manufacturing method for a color filter having spacers according to the present invention, to which the method for forming spacers according to the present invention is applied, will be described.

FIGS. 2A to 2H are flow diagrams of a manufacturing method for a color filter having spacers according to an embodiment of the present invention. In addition, FIGS. 2A to 2H are sectional schematic diagrams respectively corresponding to the following Steps A to H.

Step A

On a transparent substrate 11, a black matrix 12 as a light-shielding layer having apertures is formed, and on top thereof, an ink accepting layer 13 formed of a resin composition is formed over the entire surface. According to the present invention, as the transparent substrate 11, a glass substrate is generally used; however, it is not so limited so long as the substrate has necessary characteristics for a liquid crystal element, such as transparency and mechanical strength; a plastic substrate may be used. As the light-shielding layer according to the present invention, a black stripe may be used.

The black matrix 12 is not specifically limited; known substances may be used. For example, a deposited layer of a metal such as Cr, a metal oxide, or the like formed on the transparent substrate 11 is etched in a specific pattern to form the black matrix; it may be formed by patterning a black resist coated on the transparent substrate 11.

The ink accepting layer 13 is formed of a resin composition curable by light-irradiation and/or thermal treatment and has ink absorptiveness. Preferably, in particular, it is formed of a photosensitive resin composition so that the ink absorptive property is increased or decreased by light-irradiation, and between adjacent portions to be colored 16, a non-colored portion 15 is formed by a pattern exposure system, which will be described later, to prevent color mixing. As the photosensitive resin composition, an acrylic resin, an epoxy resin, an amido resin, a phenolic resin, a polystyrene resin, or the like is used with a photo-initiator (photo-crosslinking agent) when desired. In this embodiment, a negative type of photosensitive resin composition is used in which the ink absorptive property is decreased by light-irradiation.

The above-mentioned photosensitive resin composition is coated on the transparent substrate 11 by known means such as a spin coating method, a dipping method, a roll coating method, a bar coating method, or a slit coating method to form the ink accepting layer 13 by performing pre-baking when desired.

In addition, in the ink accepting layer 13, it is preferable that ink wettability also be increased or decreased by light-irradiation while the ink absorptive property be thereby increased or decreased.

Step B

By performing pattern exposure via a photomask 14, the portion to be colored 16 having ink absorptiveness and the non-colored portion 15 having less ink absorptiveness (or non-absorptiveness) than that of the portion to be colored 16 are formed. In this embodiment, photosensitivity of the ink accepting layer 13 is the negative type. In this case, in order to form a colored portion 19 to be larger than the aperture of the black matrix 12 for preventing color-drift in the aperture of the black matrix 12, it is preferable that a photomask having an aperture pattern so as to have a smaller width of the non-colored portion 15 than that of the black matrix 12 be used.

When the photosensitivity of the ink accepting layer 13 is the positive type, by using the black matrix 12 as a photomask, the pattern exposure is possible without a photomask by performing exposure from the backside of the transparent substrate 11.

Step C

Coloring ink 18, R (Red), G (Green), and B (Blue) is supplied to the portion to be colored 16 of the ink accepting layer by an inkjet head 17 according to a predetermined coloring pattern. In this embodiment, since between adjacent portions to be colored 16, the non-colored portion 15 having small ink absorptiveness (or non-absorptiveness) is interposed, the ink extending off the portion to be colored 16 is rejected by the non-colored portion 15, thereby preventing mixture of colors between adjacent portions to be colored 16.

As the coloring ink 18 according to the present invention, any dyes and pigments may be used, so long as it is dischargeable by an inkjet system.

As the inkjet system according to the present invention, the bubble jet type using an electrothermal converter as an energy generating element, the piezoelectric jet type using a piezoelectric transducer, or the like may be used in which a coloring area and a coloring pattern can be arbitrarily set.

Step D

After the coloring ink 18 is absorbed into the portion to be colored 16 to be sufficiently diffused, drying treatment is performed when desired; furthermore, the necessary treatment such as light-irradiation, or thermal treatment is performed so as to cure the entire ink accepting layer, thereby forming a colored layer comprising the non-colored portion 15 and the colored portion 19.

Step E

A transparent conductive film 21 to be an electrode for driving a protecting layer 20 and liquid crystal are formed, when desired. As the protecting layer 20, a resin composition which is photo-curable, thermosetting, or curable by both light and heat; an inorganic film formed by vapor deposition, sputtering, etc.; or the like may be used. In any of cases, it may be used so long as it has transparency as a color filter and it is durable in subsequent manufacturing processes of the liquid crystal such as a process for forming the transparent conductive film and a process for forming the orientation film. As the transparent conductive film 21, an ITO (indium-tin-oxide) film is generally used and it can be formed into a film by a sputtering method, etc.

In the color filter according to the present invention, after forming an orientation film for orientating liquid crystal in the liquid crystal element on the transparent conductive film 21, spacers 25, which will be described later, may also be formed.

Step F

By an inkjet head 22, adhesive 23 made of a curable resin composition is partly supplied in regions overlapping on the black matrix 12. The adhesive 23 is cured by light-irradiation and/or heat treatment and affixes beads 24 after curing so as to form the spacers 25. Preferably, the adhesive 23 includes a homopolymer of the following monomers or a copolymer of the monomers and other vinyl monomers. Its content is preferably 0.01 to 30 wt %, and more preferably 0.1 to 10 wt %.

As the monomer, which is the constitution of the homopolymer or the copolymer, included in the adhesive 23, there are N, N-dimethyrolacrylamide, N, N-dimethoxymethylacrylamide, N, N-diethoxymethylacrylamide, N, N-dimethyrolmethacrylamide, N, N-dimethoxymethylmethacrylamide, N, N-diethoxymethylmethacrylamide, and so forth, for example; however, it is not so limited. These monomers are used as a homopolymer or a copolymer with other vinyl monomers. As other vinyl monomers, there may be acrylic acid esters of acrylic acid, methacrylic acid, methyl acrylate, ethyl acrylate, etc.; methacrylic acid esters of methyl methacrylate, ethyl methacrylate, etc.; vinyl monomers including a hydroxyl group such as hydroxymethyl methacrylate, hydroxyethyl methacrylate, hydroxymethyl acrylate, or hydroxyethyl acrylate; and others such as styrene, a-methyl styrene, acrylamide, methacrylamide, acrylonitrile, allyl amine, vinyl amine, vinyl acetate, and vinyl propinate.

In the above-mentioned copolymers, the copolymerization proportion (wt %) of the copolymer, the monopolymer, and the other vinyl monopolymer is preferably 100% : 0 to 5% : 95%, and more preferably 90% : 10 to 10% : 90%.

When it is furthermore photo-cured, various photo-curable resins and photo-polymerization initiators may be added. Other ingredients such as available resins and additives may by added so long as they do not cause a problem such as sticking in the adhesive; specifically, an acrylic resin or an epoxy resin may be preferably used.

When mixing the adhesive 23, the above-mentioned ingredients are mixed with and solved by water or known solvent. This operation can be performed by a known technique. Preferably, the diameter of the dot formed by the adhesive 23, which is discharged by adding solvent or surfactant, is adjusted by the material of the color filter surface (transparent conductive film 21 in this embodiment).

In order to maintain the cell gap when the liquid crystal element is formed, the adhesive 23 may be supplied to only necessary positions to be dispersed in plural points in the substrate.

As the inkjet system for supplying the adhesive 23, like the above-mentioned supplying system of the coloring ink 18, the bubble jet type using an electrothermal converter as an energy generating element, the piezoelectric jet type using a piezoelectric transducer, or the like can be used.

Step G

The beads 24 are dispersed over the entire surface of the transparent conductive film 21. The diameter of the beads 24 according to the present invention is preferably 3 to 8 μm for maintaining the cell gap of the liquid crystal element. As the bead material, silica, alumina, a synthetic resin, or the like is preferably used.

In the beads 24 dispersed in Step G, the beads dispersed on the adhesive 23 are adhered to the adhesive 23.

Step H

Like in FIG. 1C, the beads 4, which are not adhered to the adhesive 23, are removed by turning over the substrate, applying vibration, blowing air, flushing with liquid, or combination thereof. Then, the adhesive 23 is cured by a predetermined treatment such as light-irradiation, heat treatment, or the combination of light-irradiation and heat treatment, so that the spacers 25 comprising the beads 24 fixed on the transparent conductive film 21 by the adhesive 23 are formed, thereby obtaining the color filter having spacers according to the present invention. The light-irradiation or the heat treatment of the adhesive 23 is performed by using a known method.

Next, another embodiment of the manufacturing method for the color filter according to the present invention is shown in FIGS. 3A to 3G. Wherein like reference characters designate like portions common to those in FIGS. 2A to 2H, and description thereof is omitted. In addition, FIGS. 3A to 3G are sectional schematic diagrams respectively corresponding to the following Steps A to G.

Step A

On the transparent substrate 11, a black matrix 42 having apertures is formed of a black resin composition. The black matrix 42 provided with a partition function for preventing curable coloring ink 48 for forming a colored portion 49 from being mixed. It is preferable that the black resin composition be provided with photosensitivity: specifically, an acrylic resin, an epoxy resin, an amide resin, a phenol resin, a polystyrene resin, or the like is used with a photo-initiator (photo-crosslinking agent) when desired, and they are used by mixing with black dyes or pigments.

The above-mentioned photosensitive black resin composition is coated by known means such as a spin coating method, a dipping method, a roll coating method, a bar coating method, or a slit coating method; after performing pre-baking when desired, the black matrix 42 having a predetermined pattern is obtained by performing pattern exposure and development.

Step B

The curable coloring ink 48 is supplied to the apertures of the black matrix 42 by an inkjet head 47. As the curable coloring ink 48, a coloring resin composition 10 including a resin curable by applying energy such as light-irradiation and heat treatment and dyes or pigments of R, G, and B are used. As the above-mentioned resin, a melamine resin, combination of a polymer including a hydroxyl group or a carboxyl group and melamine, combination of a polymer is including a hydroxyl group or a carboxyl group and a multifunctional epoxy compound, combination of a polymer including a hydroxyl group or a carboxyl group and a cellulose-reaction-type compound, combination of an epoxy resin and a resol-type resin, combination of an epoxy resin and an amine group, combination of an epoxy resin and carboxylic acid or an acid anhydride, an epoxy compound, a negative type resist, and so forth are used.

As the inkjet system, like the above-mentioned supplying system of the coloring ink in the first embodiment, the bubble jet type using an electrothermal converter as an energy generating element, the piezoelectric jet type using a piezoelectric transducer, or the like can be used; the coloring pattern can be arbitrarily set.

Step C

The curable coloring ink 48 is cured by applying drying treatment when desired and by performing the necessary treatment such as light-irradiation and heat treatment so as to form the colored portion 49. In this embodiment, the colored portion 49 corresponds to a colored layer of the color filter.

Step D

Figure 2A:
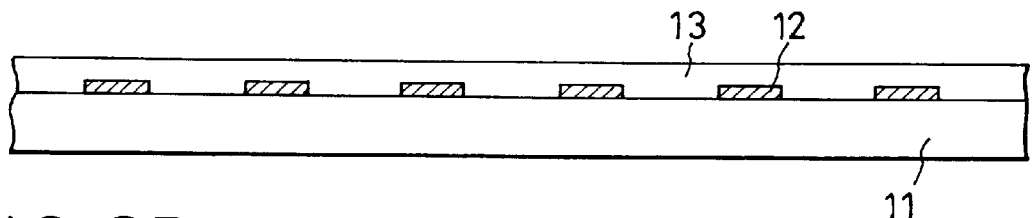
FIGS. 2A to 2H are flow diagrams of a manufacturing method for a color filter having spacers according to an embodiment of the present invention.
Figure 2B:
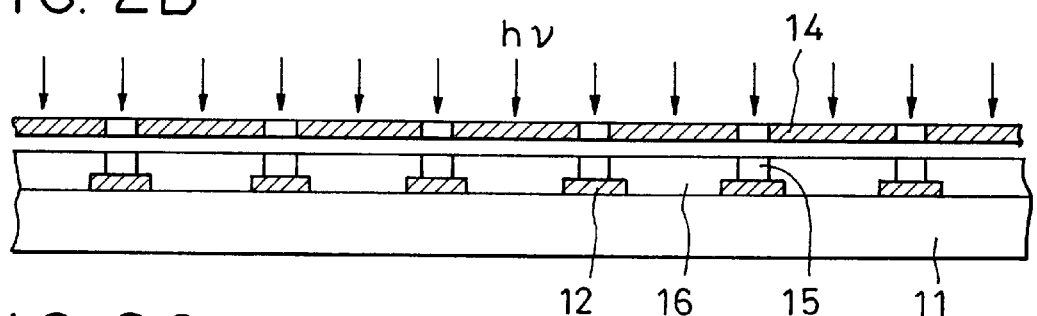
Figure 2C:
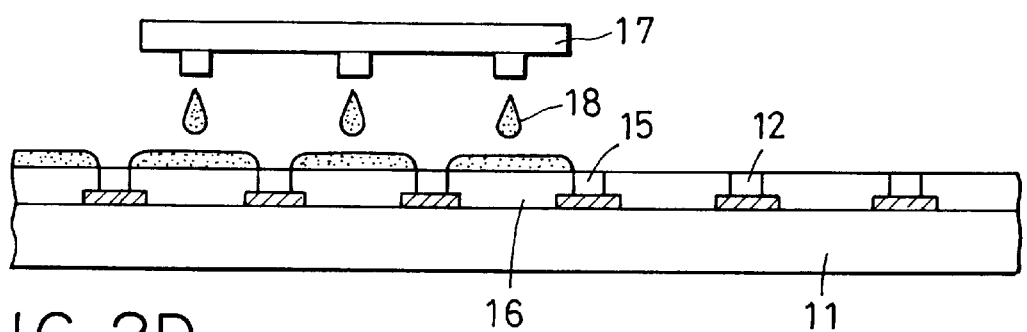
Figure 2D:
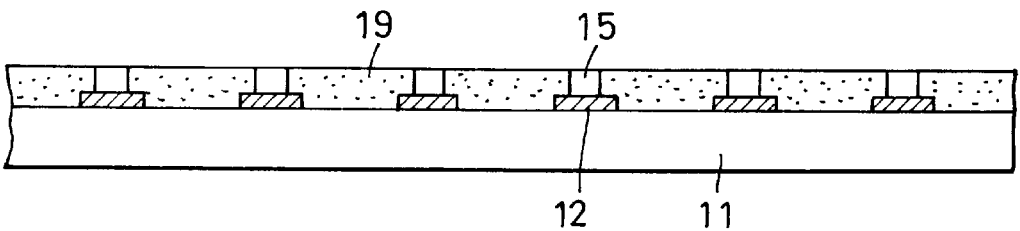
Figure 2E:
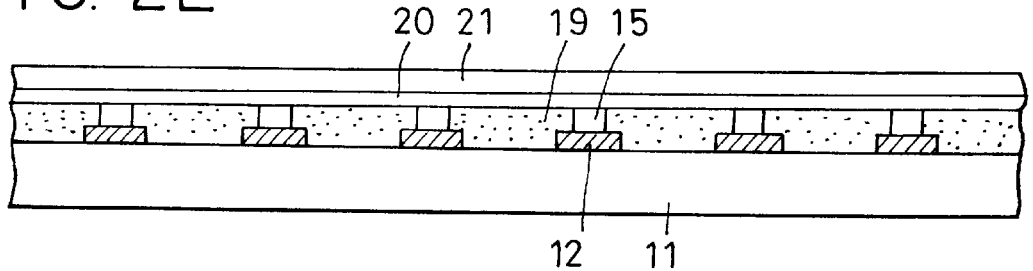

Like in FIG. 2E, the protecting layer 20 and the transparent conductive film 21 are formed on the colored layer.

Step E

Figure 2F:
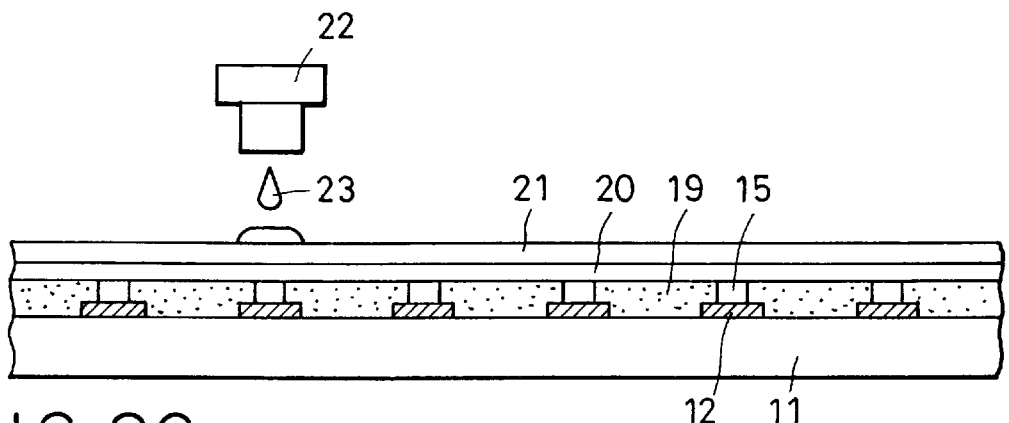

Like in FIG. 2F, by the inkjet head 22, the adhesive 23 made of a curable resin composition is partly supplied in a region overlapping the black matrix 42 on the transparent conductive film 21.

Step F

Figure 2G:
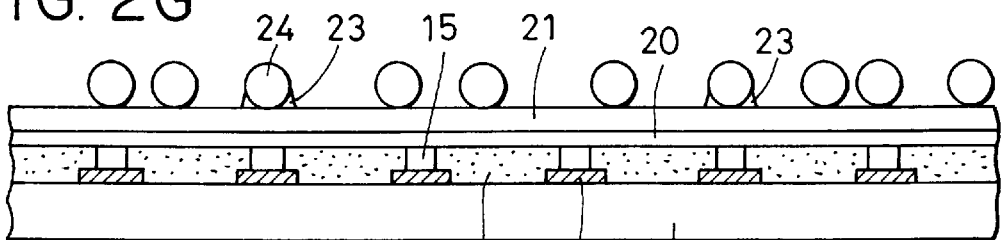

Like in FIG. 2G, the beads 24 are dispersed to be adhered to the adhesive 23.

Step G

Figure 2H:
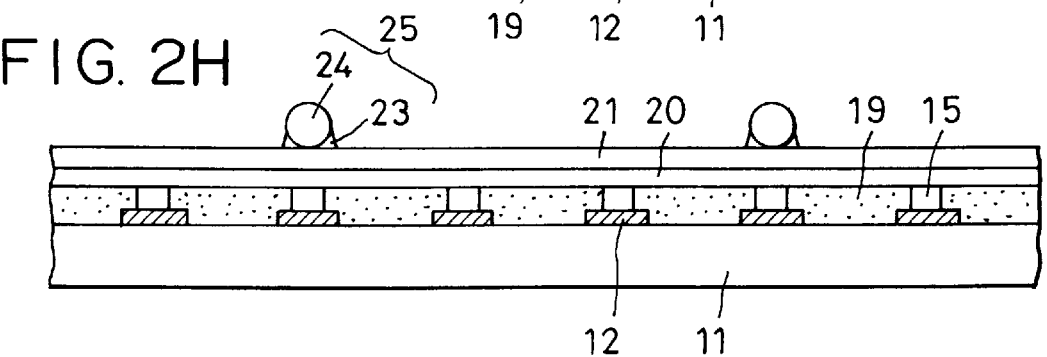

Like in FIG. 2H, after removing the beads 24 which are not adhered to the adhesive 23, the adhesive 23 is cured by the necessary treatment such as light-irradiation, heat treatment, so that the spacers 25 comprising the beads 24 fixed on the transparent conductive film 21 by the adhesive 23 are formed, thereby obtaining the color filter having spacers according to the present invention.

Figure 3A:
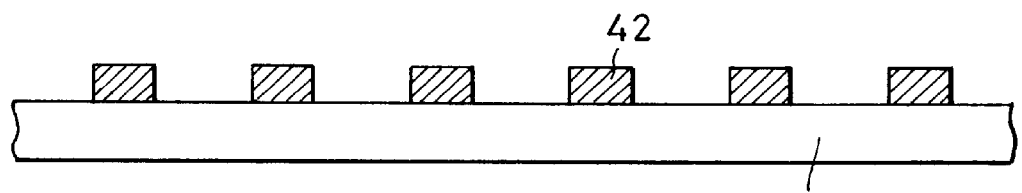
FIGS. 3A to 3G are flow diagrams of a manufacturing method for a color filter having spacers according to another embodiment of the present invention.
Figure 3B:
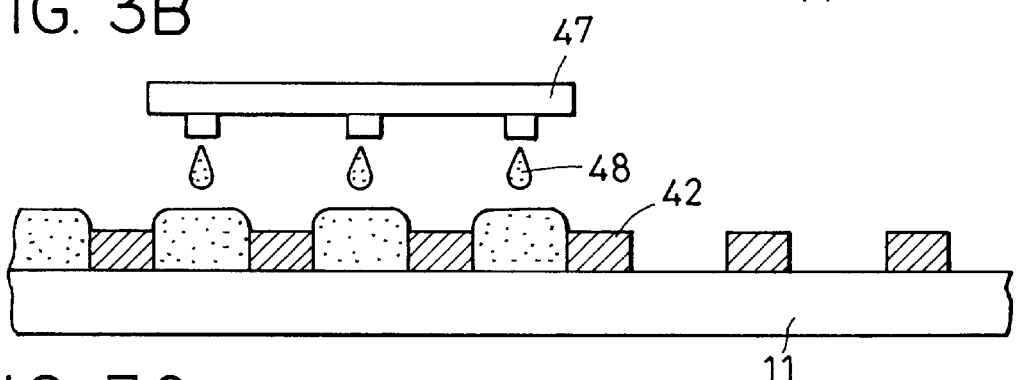
Figure 3C:
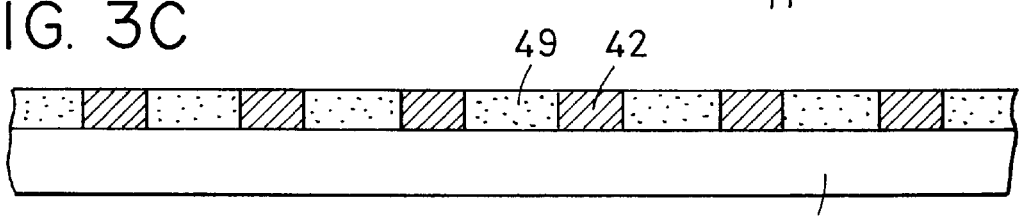
Figure 3D:
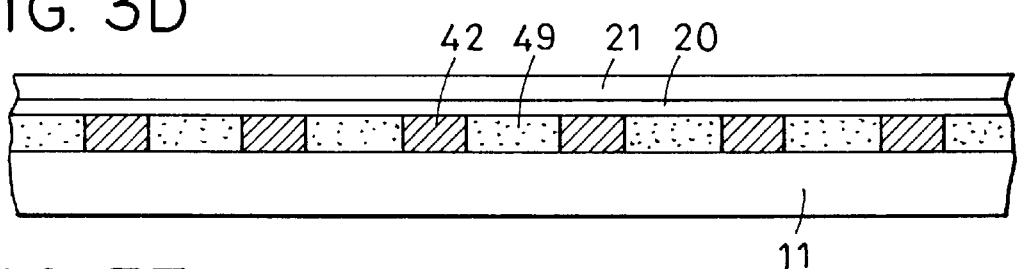
Figure 3E:
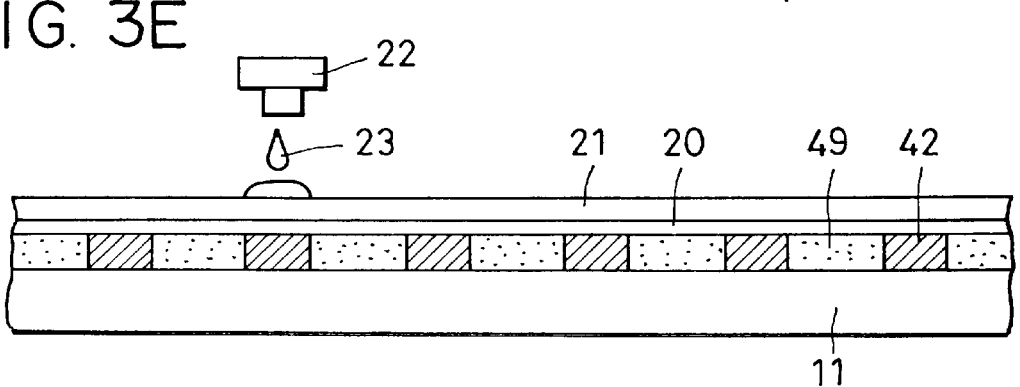
Figure 3F:
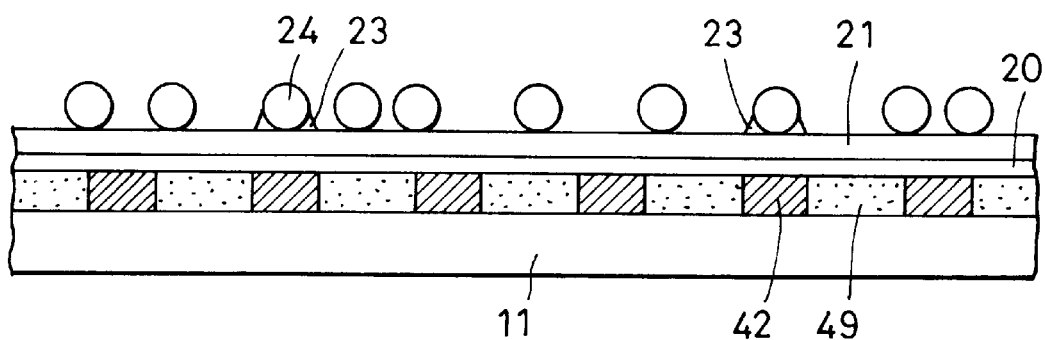
Figure 3G:
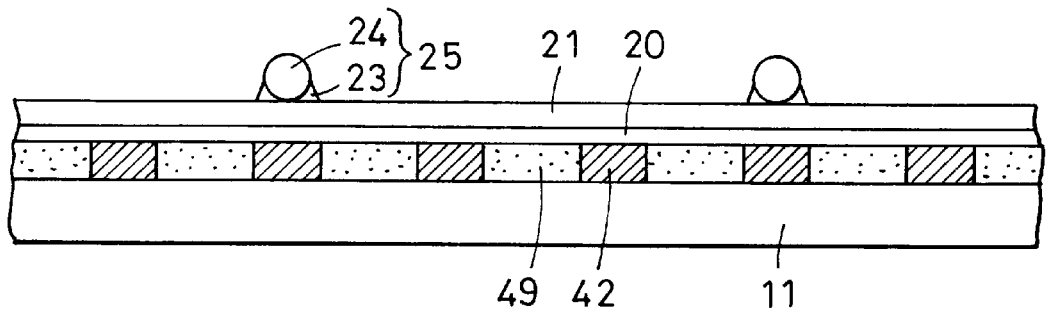

In FIGS. 2F and 3E, Step for forming the colored layer of the color filter by the inkjet system is shown; it is not so limited in the present invention; the present invention is preferably applied to a color filter so that the colored layer is formed by a conventional method such as a pigment dispersion method. In addition, when using the inkjet method, a flat colored layer having smaller roughness than in the color filter made by the pigment dispersion method, etc., can be made, so that the present invention can be more efficiently performed.

Figure 4:
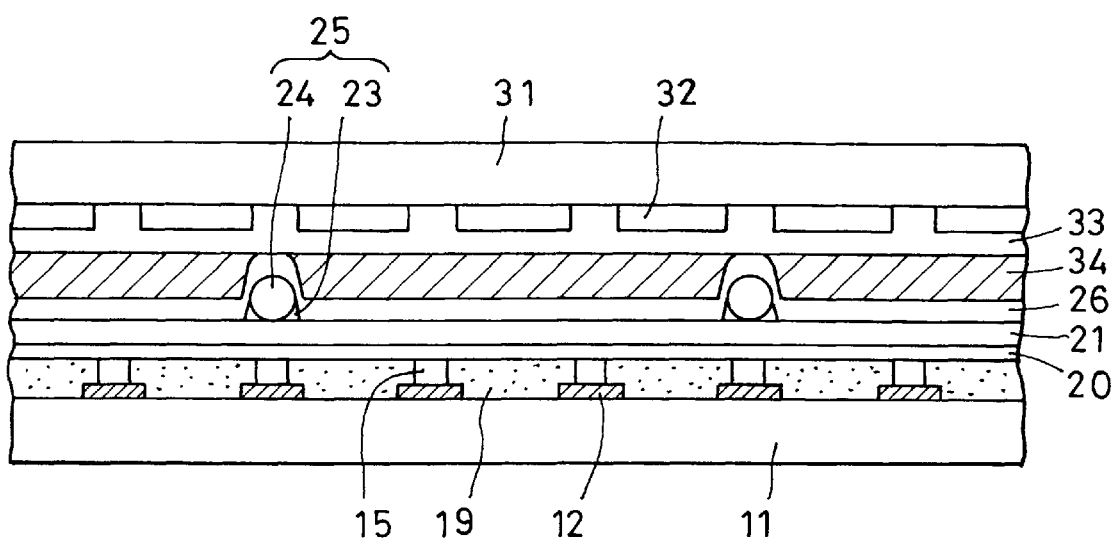
FIG. 4 is a sectional schematic diagram of a liquid crystal element according to an embodiment of the present invention, which is formed by using the color filter having spacers as shown in FIGS. 2A to 2H.

Next, an example of a liquid crystal element according to the present invention is shown in FIG. 4. FIG. 4 is a sectional schematic diagram of an example of a liquid crystal element formed by using the color filter having spacers according to the present invention shown in FIG. 2H. The liquid crystal element is an example of active matrix type (so called TFT type) liquid crystal elements in which a TFT (thin film transistor) is arranged per one pixel.

A color-display liquid crystal element is generally formed by overlaying the substrate 11 in the color filter side on an opposing substrate 31 and by containing liquid crystal 34 therebetween. Inside the opposing substrate 31, TFTs (not shown) and transparent pixel electrodes 32 are formed in a matrix pattern. Inside the transparent substrate 11, the colored portions 19 of the color filter are provided so that R, G, and B are arranged at positions opposing the pixel electrodes 32, and on top thereof, the transparent conductive film 21 (common electrode) is formed over the entire surface. Furthermore, between surfaces of both the substrates, orientation films 26 and 33 are formed; by the rubbing treatment of these films, liquid crystal molecules can be oriented in a predetermined direction. The distance between these substrates is constantly maintained by the spacers 25; the substrates are arranged so as to oppose each other and bonded together by a sealing material (not shown); the clearance therebetween is filled with the liquid crystal 34. As the liquid crystal, any of generally used TN type liquid crystal, ferroelectric liquid crystal, and so forth can be used.

In the liquid crystal element, sheet polarizers are arranged outside both the substrates and a back-light of the general combination of a fluorescent lamp and a scattering board is used in the transmission type while in the reflecting type, the sheet polarizer is arranged outside the transparent substrate 11, so that display is performed by functioning each liquid crystal 34 as an optical shutter for changing the transmission rate of light.

In the above-mentioned embodiment, the TFT type liquid crystal element has been described; the present invention is preferably applied to other driving type liquid crystal elements such as a simple matrix type. The liquid crystal element according to the present invention is preferably used as any of the direct-view-type and the projection type.

Embodiment

A lattice structural black matrix having widths of 15 µm and 30 µm and having apertures of 85 µm×220 µm, was obtained by forming a chromium metallic film having a thickness of 0.1 μm on a glass substrate by sputtering and etching it by using a photoresist.

A resin composition of 97 parts by weight of an acrylic copolymer having the following composition and 3 parts by weight of triphenylsulfoniumhexafluoroantimonate, the composition being dissolved in ethyl Cellosolve, was spin coated to have a film thickness of 2 μm on the glass substrate and pre-baked at 90° C. for 20 min so as to form the ink accepting layer.

[Composition of the acrylic copolymer]

| | |
|---|---|
| methyl methacrylate | 50 parts by weight |
| hydroxyethyl methacrylate | 30 parts by weight |
| N-methyrolacrylamide | 20 parts by weight |

Next, a part of the ink accepting layer on the black matrix was pattern-exposed in a stripe pattern via a photomask having stripe-shaped apertures having smaller widths than those of the black matrix, and furthermore, was heat-treated for 1 min on a hot plate at 120° C. Then the non-exposed portions were colored in a stripe pattern of continuous dots by dyeing ink, R (Red), G (Green), and B (Blue) using an inkjet recording system and thereafter the ink was dried at 90° C. for 5 min. Continuously, the entire ink accepting layer was cured by the heat treatment at 200° C. for 60 min so as to have the colored layer.

On the colored layer, the protecting layer made of an acrylic resin was formed by using a spin coater and planarization was carried out thereon. On top thereof, the ITO film having a thickness of 0.1 μm was further formed by sputtering, furthermore, the orientation film made of polyimide and having a thickness of 0.1 μm was formed thereon.

On the orientation film, the adhesive of the following composition including an easy-adhering constituent was discharged in dots in plural positions on the black matrix having a width of 15 μm from an inkjet head.

[Composition of the adhesive]
copolymer of acrylic acid—methyl methacrylate—hydroxy ethyl methacrylate (proportion by weight; 20 : 50 : 30)

| | |
|---|---|
| | 3 wt % |
| diethylene glycol | 20 wt % |
| water | 77 wt % |

On the orientation film on which the adhesive is supplied, glass beads having a diameter of 6 μm were dispersed. The beads, which are not adhered to the adhesive, were removed by turning the substrate upside down. Furthermore, the heat treatment at 230° C. for 60 min was performed thereon so as to affix the beads by curing the adhesive.

The color filter having spacers obtained in such a manner and the glass substrate on which opposing electrodes are formed were bonded together by using a sealing material so as to form a cell, and liquid crystal was contained therebetween so as to obtain the liquid crystal element according to the present invention. The obtained liquid crystal element had not irregular color and had excellent contrast.

As described above, according to the method for forming spacers of the present invention, spacers having a desired height can be readily formed in desired regions. Thereby, in members or apparatuses, such as various kinds of displays and recording media, formed by pilling up plural substrates or layers via a predetermined clearance, reliability can be improved while the yield is increased and cost is decreased in the manufacturing.

According to the manufacturing method for a color filter having spacers of the present invention, since the spacers can be selectively formed by the inkjet system only in the light-shielding regions, which have not an effect on display, the loss of the material for forming the spacers is maintained small and there are no worries that the lower portions of the spacers are contaminated by devoloper, etc. In the color filter and the liquid crystal element according to the present invention, since the beads as the spacers are affixed to the color filter, there is no danger of separating of the beads in the subsequent process such as the forming step of the orientation film and after forming the liquid crystal element. Thereby, according to the present invention, a reliable liquid crystal element in that the cell gap is evenly maintained can be provided in a high yield at lower cost.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for forming spacers on a substrate, comprising the steps of:

supplying adhesive at a position for forming each of the spacers on the substrate by an inkjet system;

dispersing beads, each bead having a diameter corresponding to the height of the spacer, so as to adhere the beads to adhesive; and removing the beads that are not adhered to the adhesive from the substrate.

2. A method according to claim 1, wherein the particle size of the bead is 1 to 10 μm and the coating area of the adhesive supplied on the substrate is 10 to 10000 μm² per one position.

3. A manufacturing method for a color filter having spacers, the method comprising the steps of:

forming a color filter by forming on a substrate at least a light-shielding layer having plural apertures and a colored layer having colored portions arranged in each of the apertures of the light-shielding layer;

supplying adhesive made of a curable resin composition in regions overlapping the light-shielding layer on the color filter by an inkjet system;

dispersing beads on the color filter so as to stick the beads to the adhesive; and removing the beads that are not adhered to the adhesive from the color filter.

4. A manufacturing method according to claim 3 further comprising the step of forming a protecting layer on the colored layer to form the spacers thereon.

5. A manufacturing method according to any one of claims 3 and 4 further comprising the step of forming a transparent conductive film on the colored layer to form the spacers thereon.

6. A manufacturing method according to claim 3 further comprising the step of forming an ink accepting layer made of a resin composition on the entire surface of the substrate so as to form the colored layer thereon by supplying coloring ink to the ink accepting layer by an inkjet system.

7. A manufacturing method according to claim 3 wherein the light-shielding layer having apertures is formed of a black resin composition and curable coloring ink is supplied to the apertures of the light-shielding layer to be cured, thereby forming the colored layer.

8. A liquid crystal element comprising:

a pair of substrates; and liquid crystal clamped between the pair of substrates, wherein one of the pair of substrates is a color filter having spacers made by a manufacturing method according to claim 3 and the distance between the pair of substrates is maintained by the spacers.

* * * * *

UNITED STATES PATENT AND TRADEMARK OFFICE
CERTIFICATE OF CORRECTION

PATENT NO. : 6,339,461 B1
DATED : January 15, 2002
INVENTOR(S) : Kashiwazaki, Akio et al.

It is certified that error appears in the above-identified patent and that said Letters Patent is hereby corrected as shown below:

Title page,
Item [57], ABSTRACT,
Line 10, "invention, the method" should read -- invention --.

Column 1,
Line 33, "approximate" should read -- approximately --; and
Line 66, "pilled" should read -- piled --.

Column 3,
Line 4, "regions," should read -- regions --.

Column 6,
Line 20, "a-methyl" should read -- α-methyl --.

Column 7,
Line 14, "provided" should read -- is provided --;
Line 32, "composition 10" should read -- composition --; and
Line 37, "is" should be deleted.

Column 8,
Line 64, "Embodiment" should read -- Example --.

Column 9,
Line 40, should be deleted;
Line 41, should be deleted;
Line 42, should be deleted;
Line 43, should be deleted;
Line 46, "3 wt%" should read -- copolymer of acrylic acid - methyl methacrylate - hydroxy ethyl methacrylate (proportion by weight: 20 : 50 : 30) --; and
Line 67, "pilling" should read -- piling --.

Column 10,
Lines 56 and 63, "claim 3" should read -- claim 3, --;
Line 60, "4" should read -- 4, --; and

UNITED STATES PATENT AND TRADEMARK OFFICE
CERTIFICATE OF CORRECTION

PATENT NO. : 6,339,461 B1
DATED : January 15, 2002
INVENTOR(S) : Kashiwazaki, Akio et al.

It is certified that error appears in the above-identified patent and that said Letters Patent is hereby corrected as shown below:

Column 11,
Line 1, "claim 3" should read -- claim 3, --.

Column 12,
Line 4, "claim 3" should read -- claim 3, --.

Signed and Sealed this

Eighth Day of April, 2003

JAMES E. ROGAN
*Director of the United States Patent and Trademark Office*